United States Patent [19]

Satoh et al.

[11] 4,002,821
[45] Jan. 11, 1977

[54] STRAIN RELIEF GROMMET

[75] Inventors: Sei'ichi Satoh; Kazuo Sekiguchi, both of Yokohama, Japan

[73] Assignee: NIFCO Inc., Tokyo, Japan

[22] Filed: June 24, 1976

[21] Appl. No.: 699,814

[30] Foreign Application Priority Data

June 27, 1975 Japan ............................ 50-89946

[52] U.S. Cl. ................................ 174/153 G; 16/2; 248/56
[51] Int. Cl.² ................. H01B 17/26; H01R 13/58; F16L 5/00
[58] Field of Search ............ 174/65 G, 135, 152 G, 174/153 G; 16/2; 24/73 S; 248/56; 339/103 R, 103 B, 105, 107

[56] References Cited
UNITED STATES PATENTS

| | | | |
|---|---|---|---|
| 2,424,759 | 7/1947 | Klumpp, Jr. | 174/153 G |
| 3,141,062 | 7/1964 | Rapata | 174/153 G |
| 3,424,856 | 1/1969 | Coldren | 174/153 G |
| 3,749,818 | 7/1973 | Jemison | 174/153 G |

*Primary Examiner*—Laramie E. Askin
*Attorney, Agent, or Firm*—Jack R. Halvorsen; Robert W. Beart

[57] ABSTRACT

A grommet is disclosed, which grommet comprises a female member of a U-shaped end face containing a U groove for accommodating a stretched cord and provided at one extremity of said U groove with an elevated wall rising from the bottom of said groove and at the other extremity with a projecting wall extending inwardly from one side wall and a male member adapted to fit the U groove of the female member for fast engagement therewith, whereby the engagement of the male and female members gives rise to a laterally elongate opening on the side incorporating said elevated wall and a longitudinally elongate opening on the side incorporating the projecting wall. When the male and female members are brought into mutual engagement with a cord interposed therebetween, the cord is fastened in position in its twisted state within the grommet.

3 Claims, 8 Drawing Figures

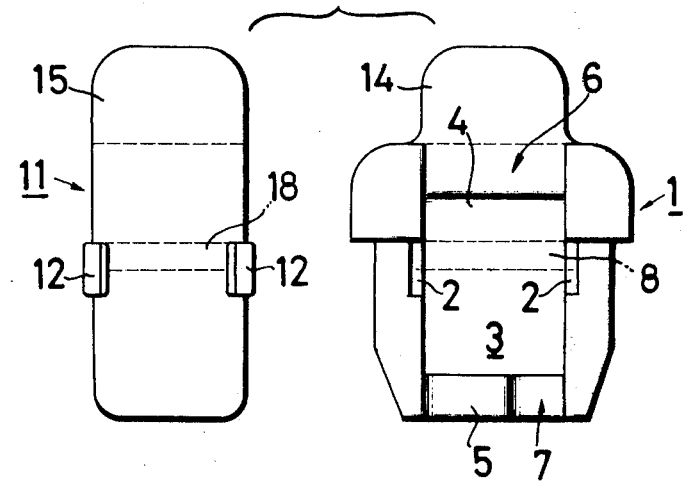
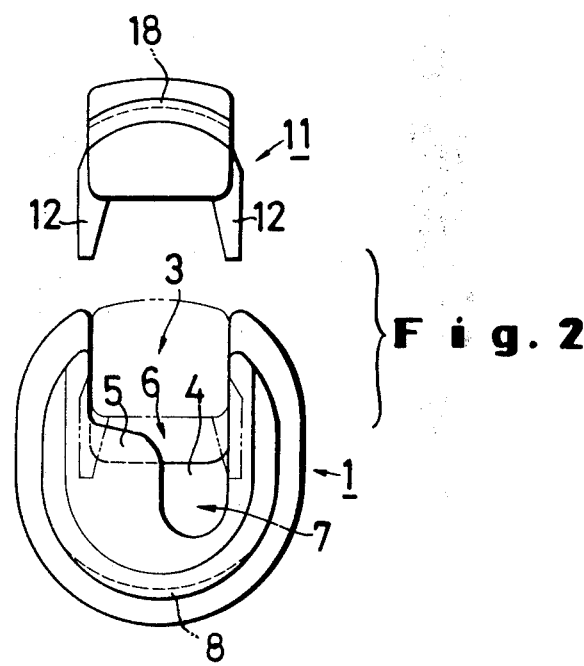

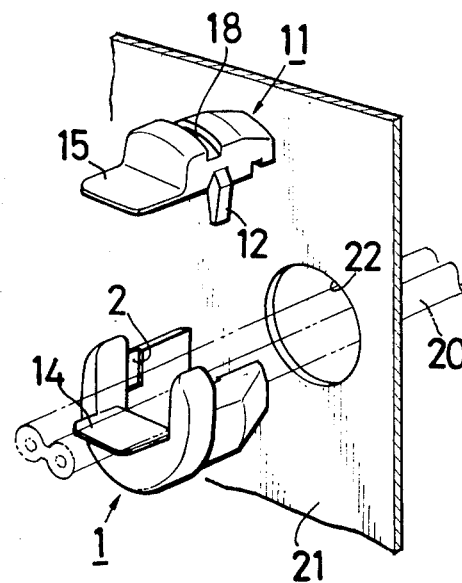
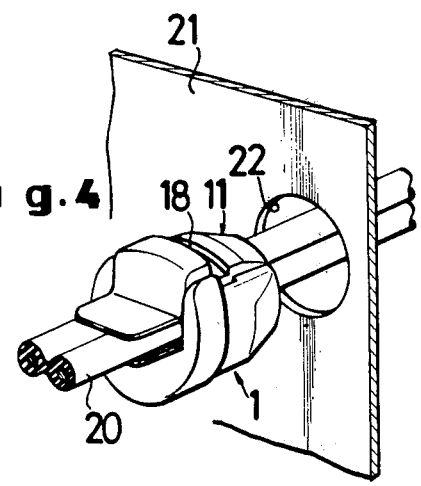
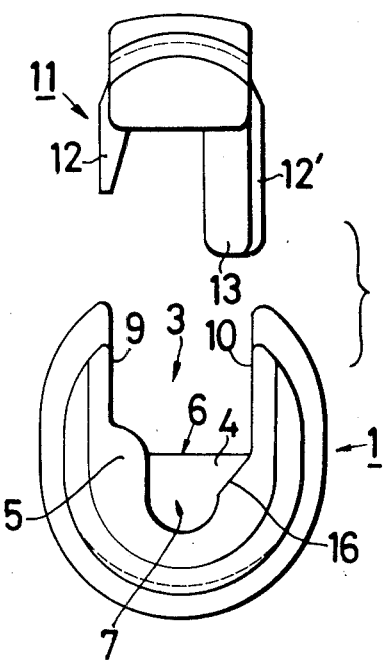
Fig. 3
Fig. 4
Fig. 5

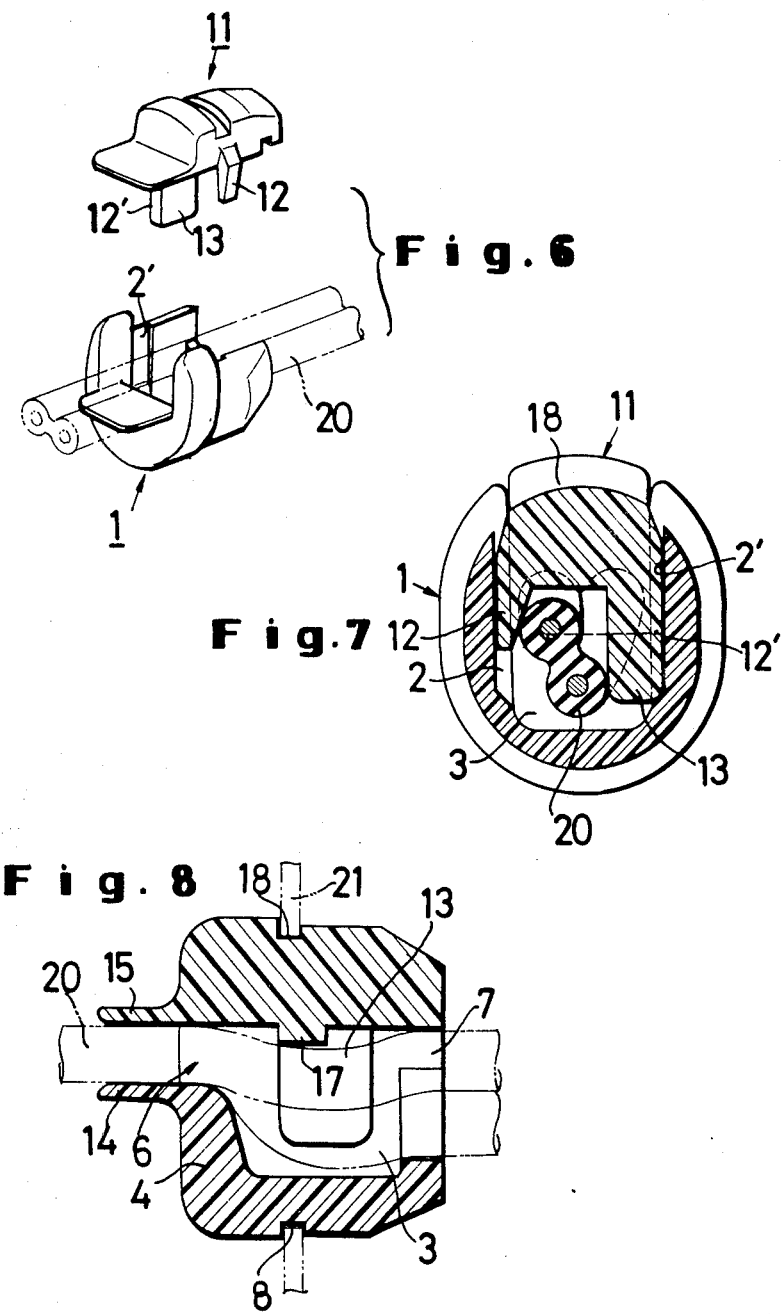

STRAIN RELIEF GROMMET

BACKGROUND OF THE INVENTION

This invention relates to a grommet. More particularly, this invention relates to a grommet made of a synthetic resin and used for the purpose of protectively fastening a power supply cord against a perforation bored such as in the chassis of an electric appliance for thereby ensuring insulation of said power supply cord from said chassis of the electric appliance when said power supply cord is led out of the electric appliance through the perforation bored in said chassis, also preventing the cord from possible injury due to contact with the edge of said perforation and further avoiding disconnection of said cord from the electric appliance because of a pull given to the cord.

Various types of grommets designed to provide fast attachment of cords have been proposed to date. The ordinary grommets proposed to date have a common construction wherein one of the component members is provided with a depression and the other member with a protrusion adapted to be admitted into said depression, a given cord is interposed between the depression and protrusion and, by virtue of the fact that the two members are thrust into a perforation bored in the chassis, the cord is forcibly bent in an extremely zigzagging shape between the depression and protrusion and thus fastened in position.

Grommets of the type just described, however, have a possibility that the continuity of the electric cord may be broken because the cord is bent in the zigzagging shape in a short interval of space and another possibility that the sheath covering the cord may be ripped off by the engagement between the depression and protrusion.

An object of the present invention is to provide a grommet which is capable of protecting the cord led out of the perforation bored in the chassis of an electric appliance against possible damage by the edge of the perforation and, at the same time, enabling the cord to be powerfully and safely fastened in position without exposing the cord to any excessive strain.

Another object of the present invention is to provide a grommet which can easily be shaped of a plastic material by the technique of injection molding.

SUMMARY OF THE INVENTION

To accomplish the objects described above, the grommet according to the present invention comprises a female member of a U-shaped end face containing a U groove for accommodating a cord and provided at one extremity of said U groove with an elevated wall rising from the bottom of said groove and at the other extremity of said U groove with a projecting wall extending inwardly from one side wall and a male member provided with a thrusting piece adapted so that said piece hangs down along the other side wall of said female member when the male member is brought into engagement with the U groove in the female member.

A cord is laid horizontally in the U groove of the female member and then is brought down from above the cord into engagement with the female member. Consequently, the cord is twisted by 90° and fastened in that state inside the grommet, with one end of the cord led out horizontally through the opening of the grommet on the side containing the elevated wall and the other end of the cord led out vertically through the opening of the grommet on the side containing the projecting wall. Since the cord is twisted and fastened in position in the twisted state inside the grommet, the cord can be safely immobilized without the possibility of escape by slippage.

The grommet of the present invention is so simple in construction that it can easily be shaped of a plastic material by the conventional technique of injection molding.

The objects of the present invention described above and the other objects and characteristic features of this invention will become apparent from the following description and the accompanying drawing.

BRIEF DESCRIPTION OF THE DRAWING

FIG. 1 is a bottom view of the male member and a top view of the female member, illustrative of one preferred embodiment of the grommet according to the present invention.

FIG. 2 is a front view of the grommet of FIG. 1 in its disassembled state.

FIGS. 3 and 4 are a perspective view of the grommet in its disasembled state and a perspective view thereof in its assembled state respectively.

FIG. 5 is a front view illustrating another preferred embodiment of the grommet according to the present invention, with the grommet held in its disassembled state.

FIG. 6 is a perspective view of the grommet of FIG. 5 in its disassembled state.

FIG. 7 is a lateral (frontal) cross section of the grommet or FIG. 5 in its assembled state.

FIG. 8 is a longitudinal (side) cross section of still another embodiment of the grommet according to this invention.

DETAILED DESCRIPTION OF THE INVENTION

The drawing represents a preferred embodiment of the grommet according to this invention. The grommet comprises a female member 1 and a male member 11 both formed of a thermoplastic synthetic resin. The two members are so constructed that they form a passage inside to receive a cord when they are brought into mutual engagement.

The female member 1 has a U-shaped end face and contains a U groove 3 for receiving therein a cord 20. The U groove 3 is provided at one extremity thereof with an elevated wall 4 rising from the bottom of the U wall and at the other extremity with a projecting wall 5 extending inwardly from one side wall of the U wall. When the male member 11 is brought into engagement with the female member 1 of a U-shaped cross section, therefore, a laterally elongate opening 6 is formed on the side containing said elevated wall 4 and a longitudinally elongate opening 7 is formed on the other side containing said projecting wall 5. In this construction, when a two-core parallel cord is fastened in position by the grommet of this invention, it is led out in a horizontal state from one of the openings and in a vertical state from the other opening. That is, the cord is twisted by 90° within the passage formed inside the grommet.

In order that the engagement of the male and female members may take place in the proper position, they are provided with a guide piece 12 and a guide groove 2 respectively so as to preclude possible escape of the cord in the longitudinal direction through slippage. Further, the male and female members are provided on the circumferential surfaces thereof with grooves 18 and 8 respectively so that when the two members are coupled and, in that state, thrust through the perforation 22 bored in the panel 21 such as of a chassis, the members will be undetachably fastened to the edge of said perforation 22.

With the grommet according to the present invention, when the grommet is attached such as to the panel 21, the opening 6 side of the grommet falls outside relative to the panel 21 and consequently the cord led into the opening 7 side is fastened in position, whereas the cord led out of the opening 6 is expected to be subject to strain more than is required at the edge of the aperture. For the purpose of preventing the cord from damage due to abrasion against the edge of the opening 6, the male and female members are provided at said opening 6 with finger-like pieces 14, 15 extending outwardly and possessing elasticity.

In the grommet of the construction described above, the two-core parallel cord 20 is first laid in the U groove 3 of the female member (FIG. 3), the guide piece 12 and the guide groove 2 respectively of the male and female members are joined and the male member 11 is brought into perfect engagement with the female member 1 while the cord leading out of the opening 7 side is twisted (FIG. 4). The male and female members, while pressed against each other and consequently kept in a joined state, are inserted through the aperture 22 bored in the panel 21 until the grooves 18; 8 on the male and female members snap into fast engagement with the edge of the perforation 22. Then, the two members are released of the pressure. The elastic repulsion of the cord causes the grommet to be fastened powerfully against the panel.

The cord which has been so immobilized will not move even by slippage in the direction of the length and can enjoy effective fastening without being exposed to any powerful stress.

The second preferred embodiment illustrated in FIG. 5 is so constructed as to provide more thorough fastening and easier engagement of the male and female members.

The male member 11 is provided with a thrusting piece 13 adapted so that when the male and female members are brought into union, the thrusting piece will hang down along the side wall 10 opposite the side wall 9 constituting the base of the projecting wall 5 of the U groove of the female member and assume its position close to the opening 7.

In this case, therefore, the cord 20 is laid along the U groove 3 of the female member 1 (FIG. 6) and the male member 11 and the female member 1 are engaged with each other in such way that the guide grooves 2 and 2' disposed opposite each other on the wall of the U groove of the female member and the guide pieces 12 and 12' on the male member are meshed. One side of the two-core parallel cord is pushed down by the thrusting piece 13 and caused to enter the opening 7 vertically while the cord on the opening 6 side is retained horizontally on the elevated wall 4. To smoothen the entrance of the cord through the opening 7, the opening 7 of the female member is provided with an inclined projection 16 opposite the projecting wall 5.

Consequently, the twisting of the cord within the grommet is accomplished by simply bringing the male and female members into mutual engagement.

Where the cord fastened with the grommet is expected to be exposed to strong tension, a projection 17 may be disposed by way of precaution on the surface of the male member opposite the U groove 3 of the female member 1 (FIG. 8). This projection causes the fastened cord to stagger only slightly within the grommet and checks possible cord movement in the direction of length.

According to the method whereby required fastening of the cord is attained by the engagement of the component members of the grommet as described above, the cord is free from extreme deformation of its shape, so that it will be protected thoroughly from possible damage by the edge of the panel to which the grommet is attached.

To facilitate the insertion of the grommet into the perforation bored in the panel, it is desirable that the circumference of the portion of grommet corresponding to the opening 7 be inclined and the outside diameter of the grommet at said portion be reduced as compared with the other portions.

In the foregoing preferred embodiments, the front half section containing the opening 6 bordered by the grooves 8, 18 formed in the upper and lower segments of grommet is given a greater diameter than the rear half section containing the opening 7 for the purpose of preventing the grommet from being inserted through the perforation in the panel more than is required. Desirably this construction may additionally be adopted as occasion demands. Since the grommet of the present invention has a construction as described above, it does not require the cord laid through the perforation to be caught tightly in position in an extremely zigzagging state in a short interval of space as if by the biting force of teeth obtainable by means of matched members containing a depression and a protrusion as employed in the conventional grommet. Thus, it enjoys an advantage that the possibility of the cord being broken or of the insulating coat of the cord being ripped off under excessive stress is eliminated to a great extent. Moreover, the grommet of this invention only requires the cord to be twisted in the interior of the female member and this twisting results in a change in the direction of the core wire. When the cord is laid through the grommet, therefore, it is totally deprived of the freedom of movement through the grommet unless the relative deviation between the two openings, namely the deviation by an angle of 90°, is corrected. If the cord should happen to be pulled by an unusually large external force, for example, it will not slip out of position in the direction of its length. For this reason, an extracting force exerted externally on the cord will not be transmitted to the terminal of the electric appliance to which the cord is joined. Furthermore, the elasticity manifested by the twisted cord exerts pressure on the side wall 10 via the thrusting piece protruding into the groove, with the result that high frictional resistance is generated between the thrusting piece and the side wall to enhance the strength with which the female member retains the male member in tight union. Thus, the grommet of this invention can be expected to provide thorough retaining force to the cord laid therethrough.

What is claimed is:

1. A grommet, comprising a female member having a U-shaped end face and possessing a U groove adapted to pass a cord and provided at one extremity thereof with an elevating wall rising from the bottom of said groove and at the other extremity thereof with a projecting wall extending inwardly from one side wall and a male member adapted to be brought into engagement with said female member downwardly from above said U groove, whereby the engagement of said male and female members creates a laterally elongate opening at the extremity containing said elevated wall and a longitudinally elongated opening at the extremity containing the projecting wall.

2. The grommet according to claim 1, wherein guide pieces are disposed one each on the sides of the male member destined to come into contact with the side walls of the U groove of said female member and guide grooves are disposed one each on the corresponding side walls of the U groove of the female member.

3. The grommet according to claim 1, wherein the male member is provided with a thrusting piece adapted so that when the male and female members are brought into engagement, said thrusting piece hangs down along the side wall opposite the side wall which constitutes the base for the projecting wall in the U groove of the female member.

* * * * *